US007693772B1

(12) United States Patent
Rosenberg (10) Patent No.: US 7,693,772 B1
(45) Date of Patent: Apr. 6, 2010

(54) INVESTMENT STRUCTURE AND METHOD HAVING FIXED AND CONTINGENT COMPONENTS

(75) Inventor: Mark Rosenberg, Poundridge, NY (US)

(73) Assignee: Ssaris Advisors, Stamford, CT (US)

( * ) Notice: Subject to any disclaimer, the term of this patent is extended or adjusted under 35 U.S.C. 154(b) by 828 days.

(21) Appl. No.: 11/417,240

(22) Filed: May 4, 2006

Related U.S. Application Data (62) Division of application No. 09/592,845, filed on Jun. 13, 2000, now abandoned.

(51) Int. Cl.
*G06Q 40/00* (2006.01)
(52) U.S. Cl. .................................. 705/36 R
(58) Field of Classification Search ............... None
See application file for complete search history.

(56) References Cited

U.S. PATENT DOCUMENTS

| 5,193,056 | A | | 3/1993 | Boes | |
|---|---|---|---|---|---|
| 5,812,987 | A | * | 9/1998 | Luskin et al. | 705/36 R |
| 5,864,685 | A | | 1/1999 | Hagan | |
| 6,061,661 | A | * | 5/2000 | Hagan | 705/36 R |
| 6,064,986 | A | * | 5/2000 | Edelman | 705/36 R |

OTHER PUBLICATIONS

Fabozzi, Frank J. The Handbook of Fixed Income Securities: 3rd Edition. 1991. pp. 5-6, 419-420, 669 and 947.*

Pledged account agreement, Oct. 15, 1998, between RXR Holdings LLC, RXR Holdings Trading L.P., a secured party and a custodian, 9 p.p.
Investment Management Agreement, Oct. 13, 1998, between RXR Capital Management, Inc. and a Trustee, 9 p.p.
Face of Note, RXR Holdings LLC Oct. 15, 1998, 4 p.p.
Security agreement, between RXR Holdings LLC, and a Secured Party, Oct. 15, 1998, 10 p.p.
Note purchase agreement RXR Holdings Secured Participating Notes, Oct. 20, 1998, 3 p.p.
Summary of terms and conditions for RXR Holdings Secured Participating Notes, undated, 6 p.p.
Money Management Letter, Apr. 5, 1999, www.iinews.com, "Marketing Strategies", 1 p.p.
Letter from standard & poor's ratings services, Aug. 7, 1998, to the RXR Group, Inc., 1 p.p.
MAR Structured Products, Jun. 1999, "Rated notes open doors", 1 p.p.
Article, "Deconstructing Structured Products" by Brad Cole and Rian Akey, Cole Partners LLC, undated.

* cited by examiner

*Primary Examiner*—Jason M Borlinghaus
(74) *Attorney, Agent, or Firm*—Andrews Kurth LLP (57) ABSTRACT

An investment structure including a fixed component and a contingent component for investing funds. The fixed component invests a portion of the funds in fixed income securities and generates principal plus fixed interest. The contingent component invests another portion of the funds in non-fixed income, securities and generates contingent interest. The fixed interest is selectively distributed or re-invested in the fixed component, and the contingent interest is re-invested in the contingent component in order to boost the trading pool for that component and potentially increase the return on investment.

24 Claims, 12 Drawing Sheets

INVESTMENT STRUCTURE AND METHOD HAVING FIXED AND CONTINGENT COMPONENTS

CROSS REFERENCE TO RELATED APPLICATION(S)

This is a Divisional of application Ser. No. 09/592,845 filed on Jun. 13, 2000 now abandoned, which is hereby incorporated by reference in its entirety.

FIELD OF THE INVENTION

The present invention relates to an investment structure and method having fixed and contingent components generating interest that is selectively distributed or re-invested.

BACKGROUND OF THE INVENTION

Investment structures include fixed income securities, such as treasury notes, and non-fixed income securities such as indices, futures, and options. The fixed income securities provide for a reliable return and hence low risk. Non-fixed income securities carry greater risk of loss but also can produce substantially greater returns than fixed income securities. Investors sometimes desire greater returns than a fixed income security provides without the full risk involved with non-fixed income securities.

Accordingly, a need exists for an investment structure that combines the low risk of fixed income securities with the potential for greater returns with non-fixed income securities.

SUMMARY OF THE INVENTION

A method consistent with the present invention provides an investment structure for funds to be invested. The method includes investing a first portion of the funds in a fixed component generating principal plus fixed interest and investing a second portion of the funds in a contingent component generating contingent interest. The fixed interest is selectively distributed or re-invested in the fixed component, and the contingent interest is re-invested in the contingent component.

Another method consistent with the present invention provides an investment structure for a plurality of funds to be invested. The method includes investing first portions of the plurality of funds in a pooled fixed component generating principal plus pooled fixed interest. It also includes investing second portions of the plurality of funds in a pooled contingent component generating pooled contingent interest. Using this method, the second portions can be divided and invested between a pooled distribution contingent component and a pooled re-investment contingent component, depending upon whether a portion of the pooled contingent interest is to be distributed. The pooled fixed interest is selectively distributed or is re-invested in the pooled fixed component. The pooled contingent interest is re-invested in the pooled contingent component, and a portion of it may be selectively distributed from the pooled distribution contingent component.

An investment structure consistent with the present invention includes two components for investing funds. A fixed component invests a first portion of the funds and generates principal plus fixed interest, and a contingent component invests a second portion of the funds and generates contingent interest. The fixed interest is selectively distributed or re-invested in the fixed component, and the contingent interest is re-invested in the contingent component.

Another investment structure consistent with the present invention includes two components for investing multiple funds. A pooled fixed component invests first portions of the funds and generates pooled fixed interest, and a pooled contingent component invests second portions of the funds and generates pooled contingent interest. The pooled fixed interest is selectively distributed or re-invested in the pooled fixed component. The pooled contingent interest is re-invested in the pooled contingent component, and a portion may be selectively distributed.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Investment Structures

Figure 1:
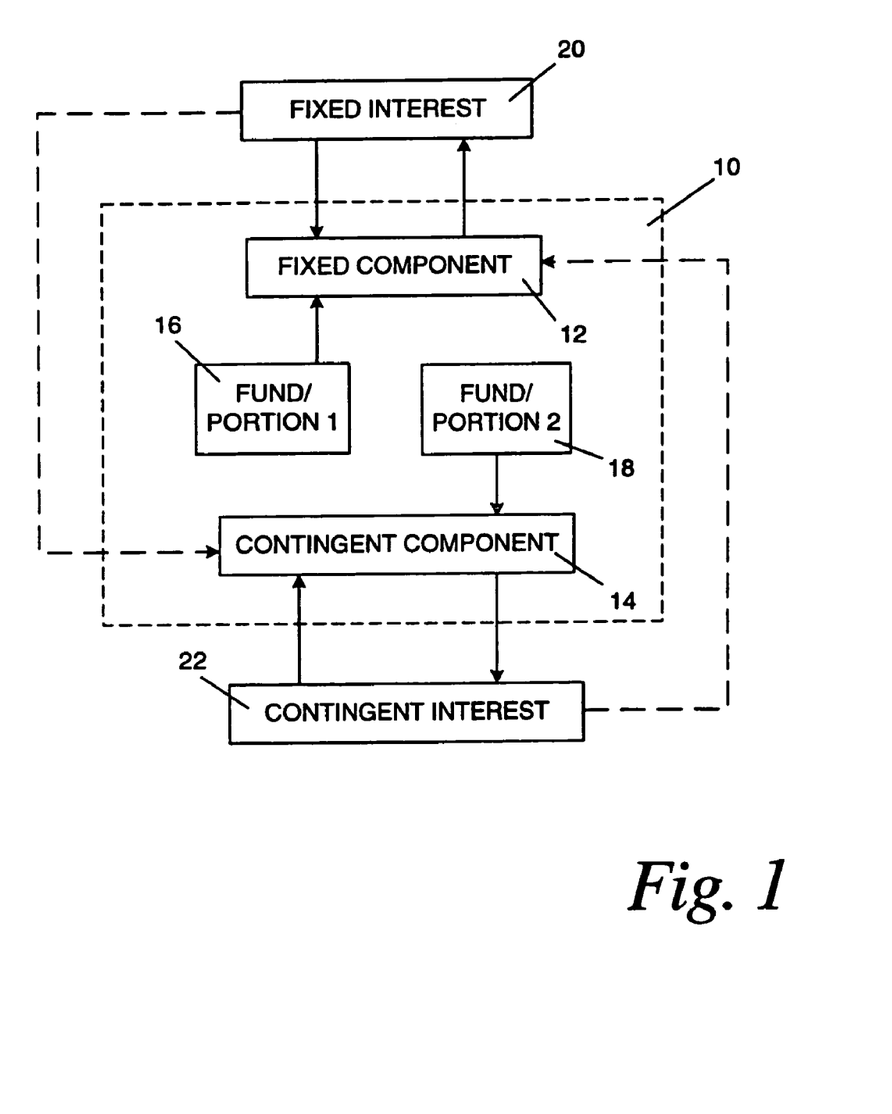
FIG. 1 is a diagram of an investment structure for a single client with fixed and contingent interest re-invested.
Figure 2:
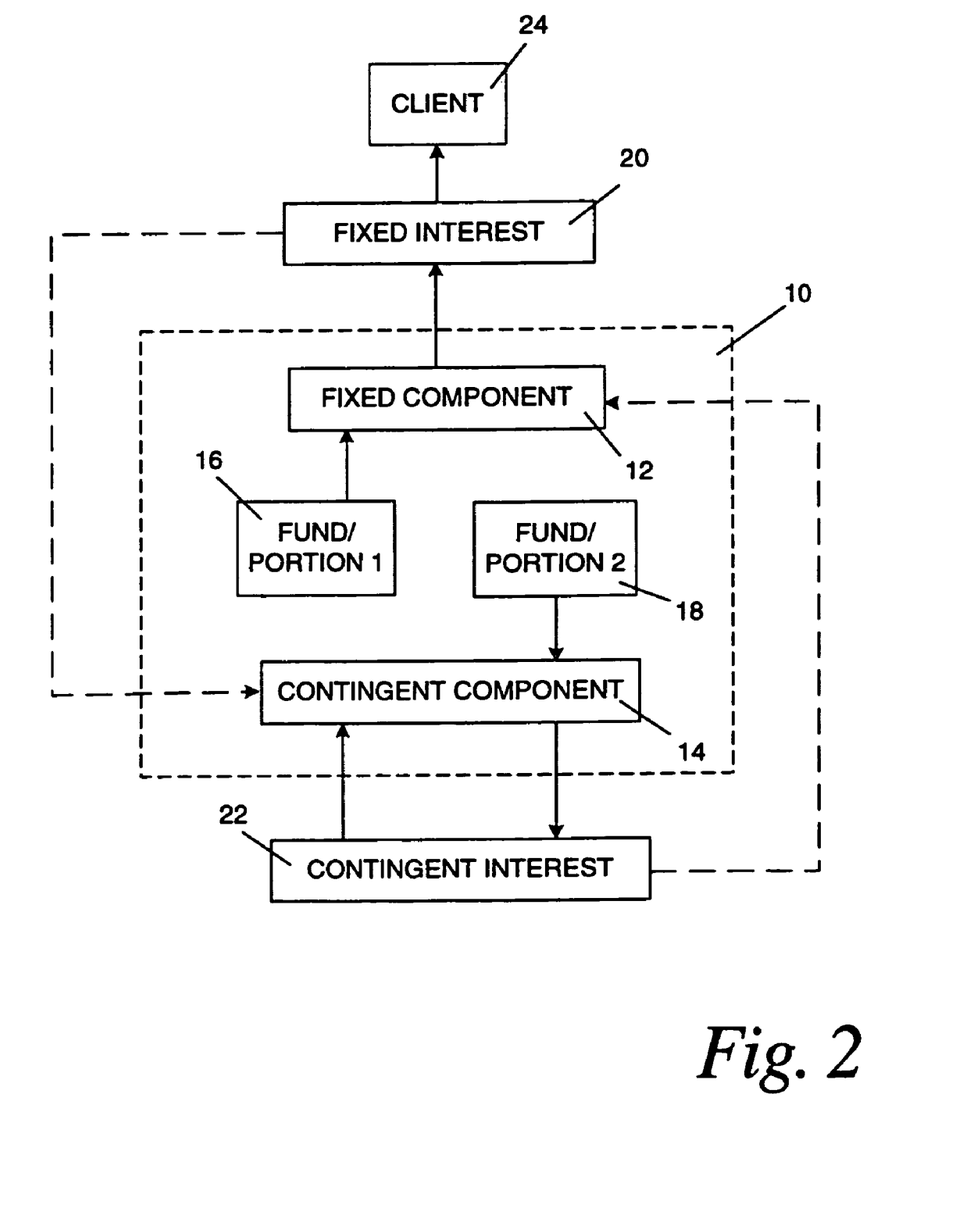
FIG. 2 is a diagram of an investment structure for a single client with contingent interest re-invested and fixed interest distributed.
Figure 3:
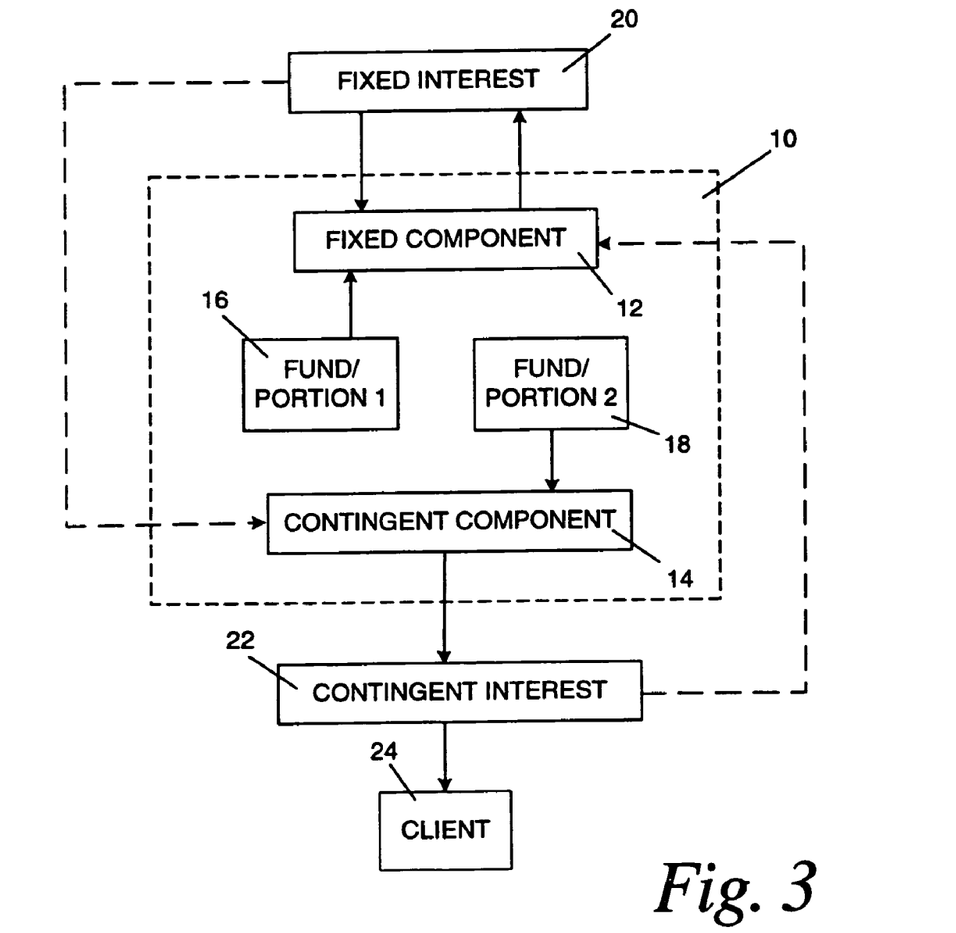
FIG. 3 is a diagram of an investment structure for a single client with contingent interest distributed and fixed interest re-invested.

FIG. 1 is a diagram of an investment structure 10 for a single client with fixed and contingent interest re-invested. FIG. 2 illustrates investment structure 10 with fixed interest distributed and contingent interest re-invested. FIG. 3 illustrates investment structure 10 with fixed interest re-invested and contingent interest distributed. As shown in FIGS. 1-3, investment structure 10 includes funds to be invested, and those funds are divided into two portions 16 and 18. Portion 16 is invested in a fixed component 12, and portion 18 is invested in a contingent component 14. In an exemplary embodiment, sixty to ninety percent of the funds (portion 16) are invested in the fixed component and the remaining ten to forty percent of the funds (portion 18) are invested in the contingent component. However, other percentages or ranges for the two portions may be used.

The term "fixed component" refers to investing in any one or more fixed income securities and examples include, but are not limited to treasury notes, AAA-rated securities, AA-rated securities, municipal bond notes, and variable rate notes. The term "contingent component" refers to any non-fixed income security and examples include, but are not limited to futures, options, and forward positions. The term "contingent interest" refers to profits from a trading company or other entity resulting from investing at least a portion of the contingent component. In addition, management fees may be deducted from one or both of the fixed and contingent components.

Fixed component 12 generates principal plus fixed interest 20, which can be re-invested in fixed component 12, as shown in FIGS. 1 and 3, or distributed to a client 24, as shown in FIG. 2. If fixed interest 20 is to be distributed, it is typically distributed on a periodic basis. Contingent component 14 generates contingent interest 22, which can be re-invested in contingent component 14, as shown in FIGS. 1 and 2, or distributed to client 24, as shown in FIG. 3. Re-investing the contingent interest boosts the trading pool for contingent component 14 to help increase the return on investment.

As an alternative shown by the dashed arrows in FIGS. 1-3, a portion of fixed interest 20 can be selectively re-invested in contingent component 14, and a portion of contingent interest 22 can be selectively re-invested in fixed component 12. Also, the distribution of the fixed and contingent interest can include distributing all of the interest or only a portion of it, and the re-investment of the fixed and contingent interest can include re-investing all of the interest or only a portion of it. As another alternative, both the fixed interest and contingent interest can be distributed during the investment period rather than re-invested.

Figure 4:
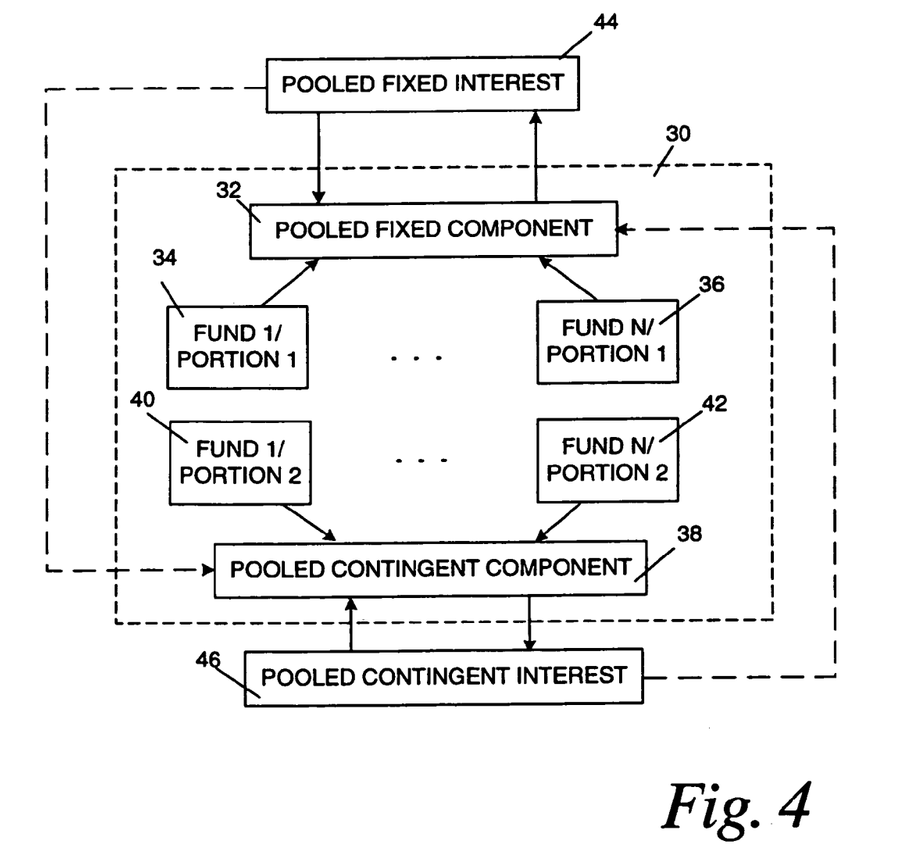
FIG. 4 is a diagram of an investment structure for multiple clients with pooled fixed interest and pooled contingent interest re-invested.
Figure 5:
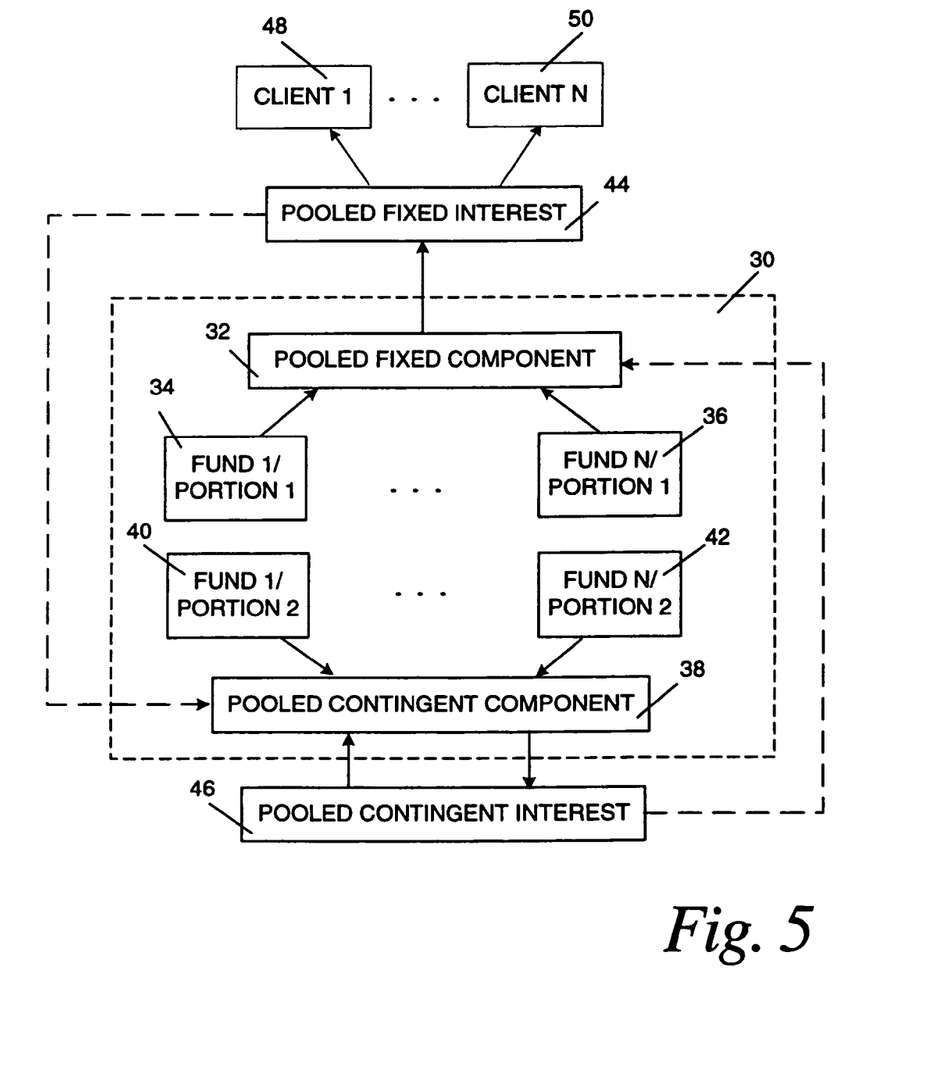
FIG. 5 is a diagram of an investment structure for multiple clients with pooled contingent interest re-invested and pooled fixed interest distributed.

FIG. 4 is a diagram of an investment structure 30 for multiple clients with pooled fixed and contingent interest re-invested, and FIG. 5 illustrates investment structure 30 with pooled fixed interest distributed. As shown in FIGS. 4 and 5, a plurality of funds are divided into first portions 34 and 36, combined, and invested in a pooled fixed component 32. The term a "plurality of funds" refers to funds from multiple clients. The plurality of funds are also divided into second portions 40 and 42, combined, and invested in a pooled contingent component 38. In an exemplary embodiment, sixty to ninety percent of the pooled funds (portions 34 and 36) are invested in the pooled fixed component and the remaining ten to forty percent of the pooled funds (portions 40 and 42) are invested in the pooled contingent component. However, other percentages for the two portions may be used.

The term "pooled fixed component" refers to any fixed component investing multiple client funds. The term "pooled contingent component" refers to any contingent component investing multiple client funds.

Pooled fixed component 32 generates pooled fixed interest 44, which can be re-invested in pooled fixed component 32, as shown in FIG. 4, or distributed to clients 48 and 50, as shown in FIG. 5. Pooled contingent component 38 generates pooled contingent interest 46, which is re-invested in pooled contingent component 38, as shown, to boost the trading pool and potentially increase the return on investment.

Figure 6:
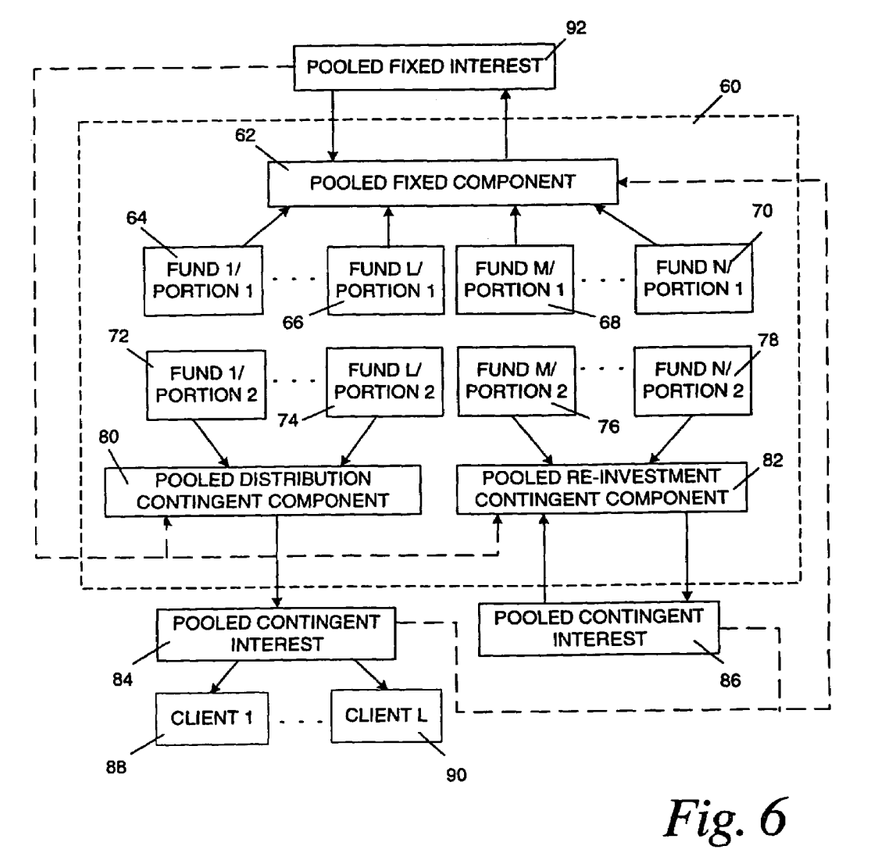
FIG. 6 is a diagram of an investment structure for multiple clients with pooled fixed interest re-invested and with pooled contingent interest selectively re-invested and distributed.
Figure 7:
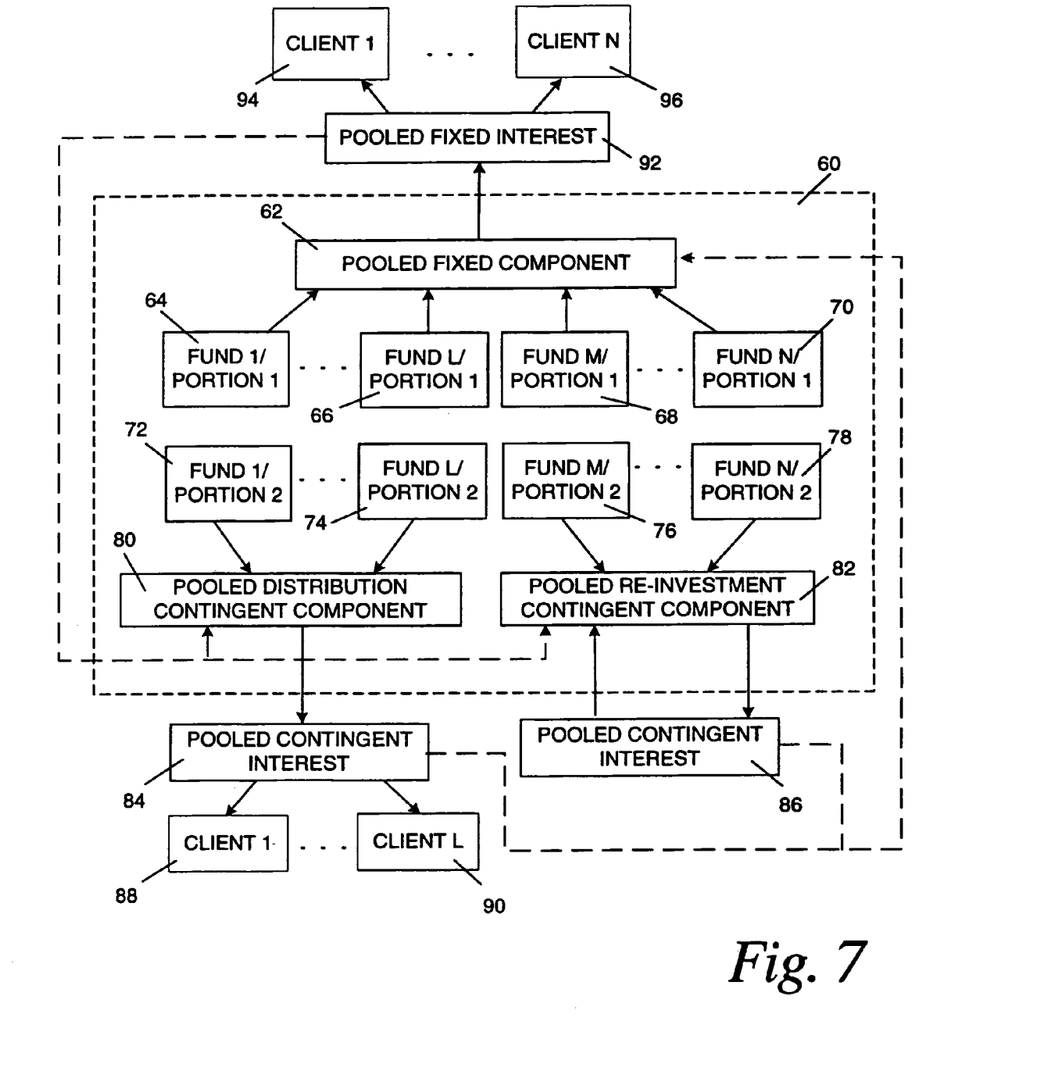
FIG. 7 is a diagram of an investment structure for multiple clients with pooled fixed interest distributed and with pooled contingent interest selectively re-invested and distributed.

FIG. 6 is a diagram of an investment structure 60 for multiple clients with pooled fixed interest re-invested and with pooled contingent interest selectively re-invested and distributed. FIG. 7 illustrates investment structure 60 with pooled fixed interest distributed. As shown in FIGS. 6 and 7, a plurality of funds are divided into first portions 64, 66, 68, and 70, which are combined and invested in a pooled fixed component 62. The funds are also divided into second portions 72, 74, 76, and 78.

For clients desiring distribution of pooled contingent interest, their funds are divided in second portions 72 and 74, which are combined and invested in a pooled distribution contingent component 80. For clients desiring re-investment of pooled contingent interest, their funds are divided in second portions 76 and 78, which are combined and invested in a pooled re-investment contingent component 82. In an exemplary embodiment, sixty to ninety percent of the pooled funds (portions 64, 66, 68, and 70) are invested in the pooled fixed component and the remaining ten to forty percent of the pooled funds (portions 72, 74, 76, and 78) are invested in the pooled distribution contingent component and the pooled re-investment contingent component as shown. However, other percentages for the two portions may be used.

The term "pooled distribution contingent component" refers to any pooled contingent component where the interest generated from it is distributed to the associated clients. The term "pooled re-investment contingent component" refers to any pooled contingent component where the interest generated from it is re-invested in the pooled contingent component.

Pooled distribution contingent component 80 generates pooled interest 84, which is distributed to clients 88 and 90. Pooled re-investment contingent component 82 generates pooled interest 86, which is re-invested in pooled re-investment contingent component 82 as shown. Pooled fixed component 62 generates pooled fixed interest 92, which can be re-invested in pooled fixed component 62, as shown in FIG. 6, or distributed to clients 94 and 96, as shown in FIG. 7.

In investment structures 30 and 60, the pooled fixed interest can be distributed to selected clients and re-invested for other clients. When the pooled fixed interest or pooled contingent interest is distributed in investment structures 30 and 60, it is typically distributed to clients on a pro rata basis depending upon the percentage of funds each client invested. The investment structures can track the percentage of funds invested by each client in order to calculate what percentage of the interest to distribute to each particular client.

As an alternative shown by the dashed arrows in FIGS. 4-7, a portion of the pooled fixed interest can be selectively re-invested in one or more of the pooled contingent components, and a portion of the pooled contingent interest can be selectively re-invested in the pooled fixed component. Also, the distribution of the pooled fixed and contingent interest can include distributing all of the pooled interest or only a portion of it, and the re-investment of the pooled fixed and contingent interest can include re-investing all of the pooled interest or only a portion of it. As another alternative, both the pooled fixed interest and pooled contingent interest can be distributed during the investment period rather than re-invested.

Investment Methods

Figure 8:
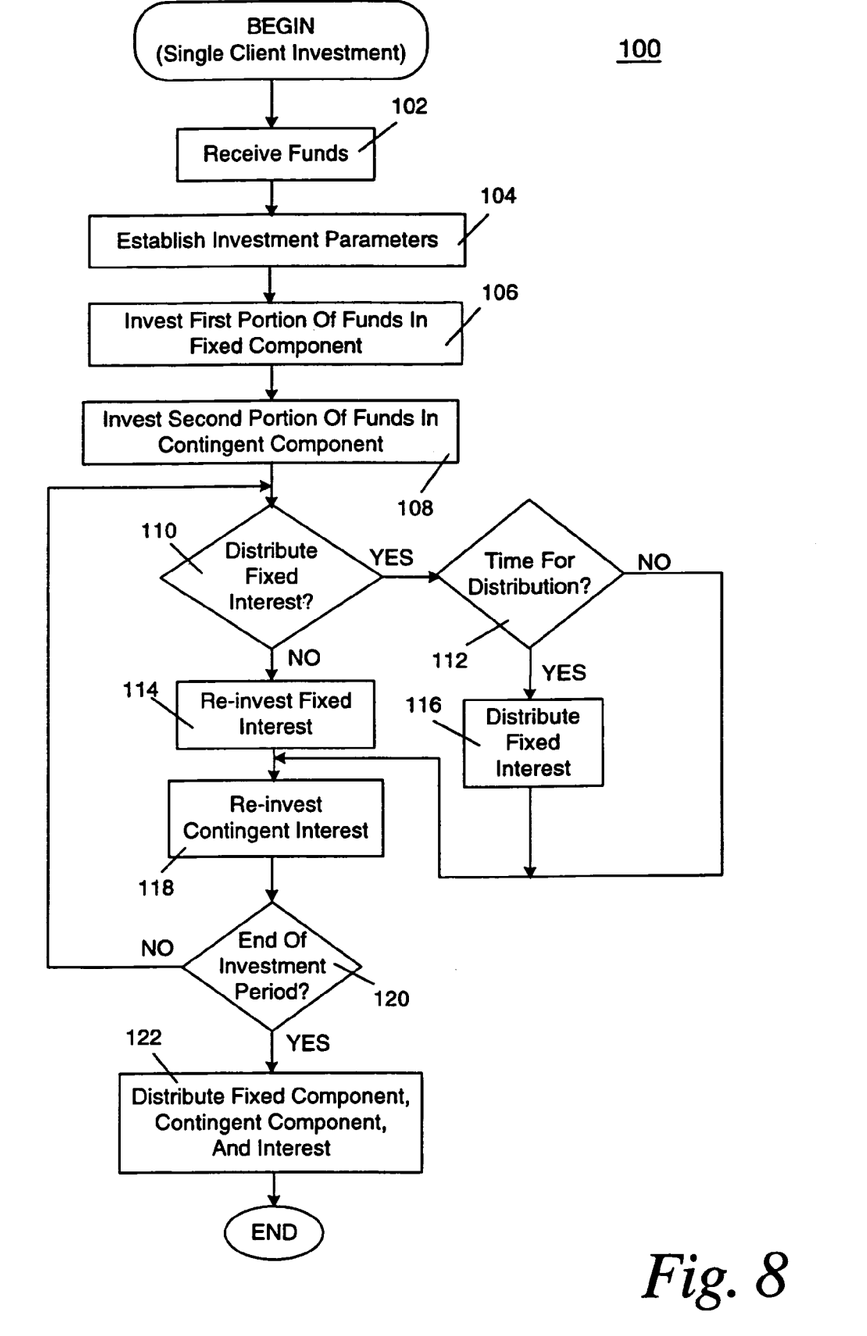
FIG. 8 is a flow chart of a method for providing an investment structure for a single client as shown in FIGS. 1-3.

FIG. 8 is a flow chart of a method 100 for providing an investment structure for a single client as shown in investment structure 10 in FIGS. 1 and 2. In method 100, the investment structure receives funds to be invested (step 102). Investment parameters are established for the investment structure (step 104). Based upon the parameters, the investment structure invests a first portion of the funds in the fixed component (step 106) and invests a second portion of the funds in the contingent component (step 108).

Investment parameters include, for example, the following: the fixed income securities for investing funds from the fixed component; the non-fixed income securities for investing funds from the contingent component; the time duration for the investment period; the percentage distribution of the funds between the fixed and contingent components; when to distribute the fixed interest, if at all, during the investment period; when to selectively distribute the pooled contingent interest for multiple clients, if at all, during the investment period; and the percentage of funds invested for each client in the pooled fixed and contingent components for multiple clients.

During the investment period, the investment structure determines whether to distribute the fixed interest (step 110) and, if so, whether it is time for distribution of the fixed interest (step 112). If it is time for distribution, the investment structure distributes the fixed interest to the client (step 116). Otherwise, if the client did not want the fixed interest distributed, the investment structure re-invests the fixed interest in the fixed component (step 114). It also re-invests the contingent interest in the contingent component (step 118).

During the investment process, the investment structure also determines, based upon the parameters, when to end the investment period (step 120). In an exemplary embodiment, the investment period is seven years; alternatively, other investment periods may be used. If the investment period has not ended, the investment structure continues to selectively distribute or re-invest the fixed interest and to re-invest the contingent interest. When the investment period has ended, the investment structure distributes the fixed component, the contingent component, and any remaining fixed and contingent interest (step 122).

Figure 9:
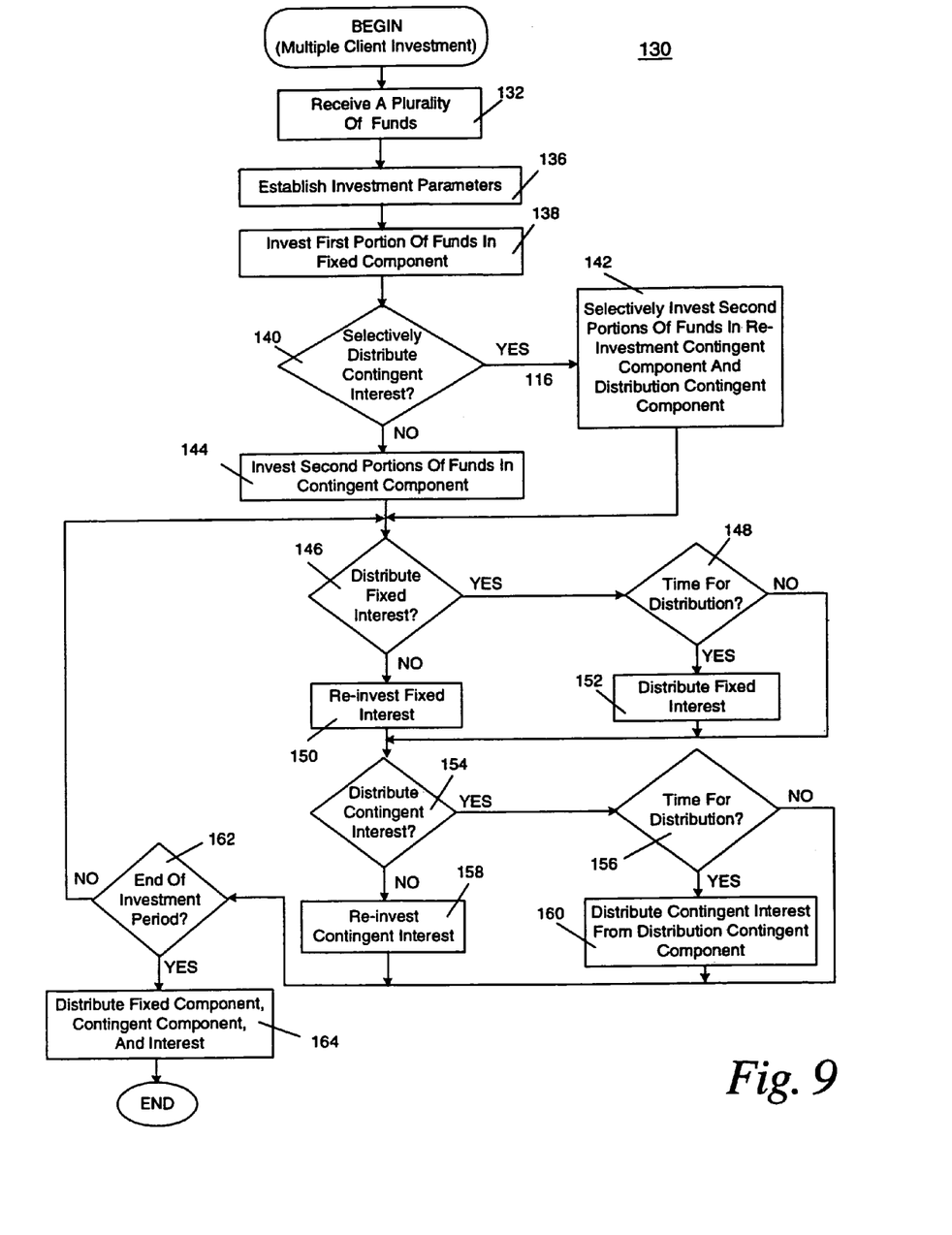
FIG. 9 is a flow chart of a method for providing an investment structure for multiple clients as shown in FIGS. 4-7.

FIG. 9 is a flow chart of a method 130 for providing an investment structure for multiple clients as shown in investment structures 30 and 60 in FIGS. 4-7. In method 130, the investment structure receives a plurality of funds to be invested (step 132). Investment parameters are established for the investment structure and can include those parameters identified above (step 136). Based upon the parameters, the investment structure invests a first portion of the funds in the pooled fixed component (step 138).

It also determines, based upon the parameters, whether to selectively distribute the pooled contingent interest (step 140). If all the pooled contingent interest is to be re-invested, the investment structure invests the second portions of the funds in the pooled contingent component (step 144). Otherwise, if part of the pooled contingent interest is to be distributed, the investment structure selectively invests the second portions of the funds in the pooled re-investment contingent component and the pooled distribution contingent component based upon which clients desire distribution of that interest (step 142).

During the investment period, the investment structure determines whether to distribute the pooled fixed interest (step 146) and, if so, whether it is time for distribution of the pooled fixed interest (step 148). If it is time for distribution, the investment structure selectively distributes the pooled fixed interest (step 152). Otherwise, if the clients, or a sub-set of them, did not want the pooled fixed interest distributed, the investment structure selectively re-invests the pooled fixed interest in the pooled fixed component (step 150).

It also determines whether to distribute the pooled contingent interest (step 154) and, if so, whether it is time for distribution of the pooled contingent interest (step 156). If it is time for distribution, the investment structure distributes the pooled contingent interest from the pooled distribution contingent component to selected clients (step 160). The investment structure also re-invests the pooled contingent interest in the pooled re-investment contingent component (step 158).

During the investment process, the investment structure also determines, based upon the parameters, when to end the investment period (step 162). If the investment period has not ended, the investment structure continues to selectively distribute or re-invest the pooled fixed interest and the pooled contingent interest. When the investment period had ended, the investment structure distributes the pooled fixed component, the pooled contingent component, and any remaining pooled fixed and contingent interest (step 164). The amounts to be distributed can be determined on a pro rata basis for each client depending upon the initial percentage of funds invested by each client among the total funds.

Computer Implementation

Figure 10:
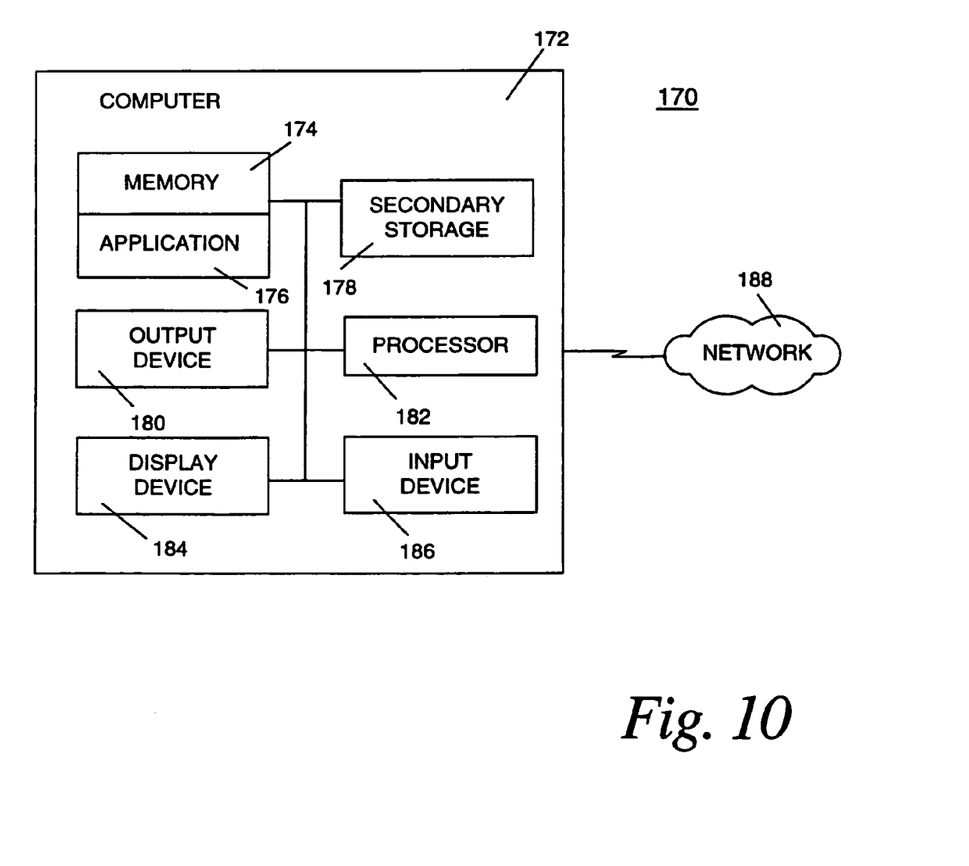
FIG. 10 is a diagram of an exemplary computer system for implementing the investment structures and methods shown in FIGS. 1-9.

FIG. 10 is a diagram of an exemplary computer system 170 for implementing the investment structures and methods shown in FIGS. 1-9. The investment structures and methods discussed above can be implemented using a software program and associated database for tracking and maintaining the funds invested according to the investment parameters. The software program can control the computer to execute the steps shown in the flow charts of FIGS. 8 and 9.

Use of a software program is not necessary to implement these investment structures and methods; however, it can facilitate the investment process, particularly when many clients are involved for the pooled components. For example, a database can specify the percentage of funds invested by each client and which clients desire distribution of the interest. A software program can then access the database at selected times and automatically determine the amount of interest to be distributed to the clients and, at the end of the investment period, the final amounts to be distributed. The software program can be used to determine the value of an individual investment at any time. In particular, to determine the value at any given time the software calculates the current value of the fixed portion with unpaid interest added, and adds the current value of the contingent portion.

System 170 includes a computer 172 illustrating exemplary hardware components for implementing, for example, software modules specifying investment structures and methods as discussed above. Computer 172 can include a connection with a network 188 such as the Internet or other type of network. Computer 172 typically includes a memory 174, a secondary storage device 178, a processor 182, an input device 186, a display device 184, and an output device 180.

Memory 174 may include random access memory (RAM) or similar types of memory, and it may store one or more applications 176 for execution by processor 182. Secondary storage device 178 may include a hard disk drive, floppy disk drive, CD-ROM drive, or other types of non-volatile data storage. Processor 182 may execute applications or programs stored in memory 174 or secondary storage device 178, or received from the Internet or other network 188. Input device 186 may include any device for entering information into computer 172, such as a microphone, digital camera, video recorder or camcorder, key pad, keyboard, cursor-control device, or touch-screen. Display device 184 may include any type of device for presenting visual information such as, for example, a computer monitor, flat-screen display, or display panel. Output device 180 may include any type of device for presenting a hard copy of information, such as a printer, and other types of output devices include speakers or any device for providing information in audio form.

Although computer 172 is depicted with various components, one skilled in the art will appreciate that this computer can contain additional or different components. In addition, although aspects of an implementation consistent with the present invention are described as capable of being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as computer 172, to perform a particular method.

Legal Framework and Method for Investment Structures

Figure 11:
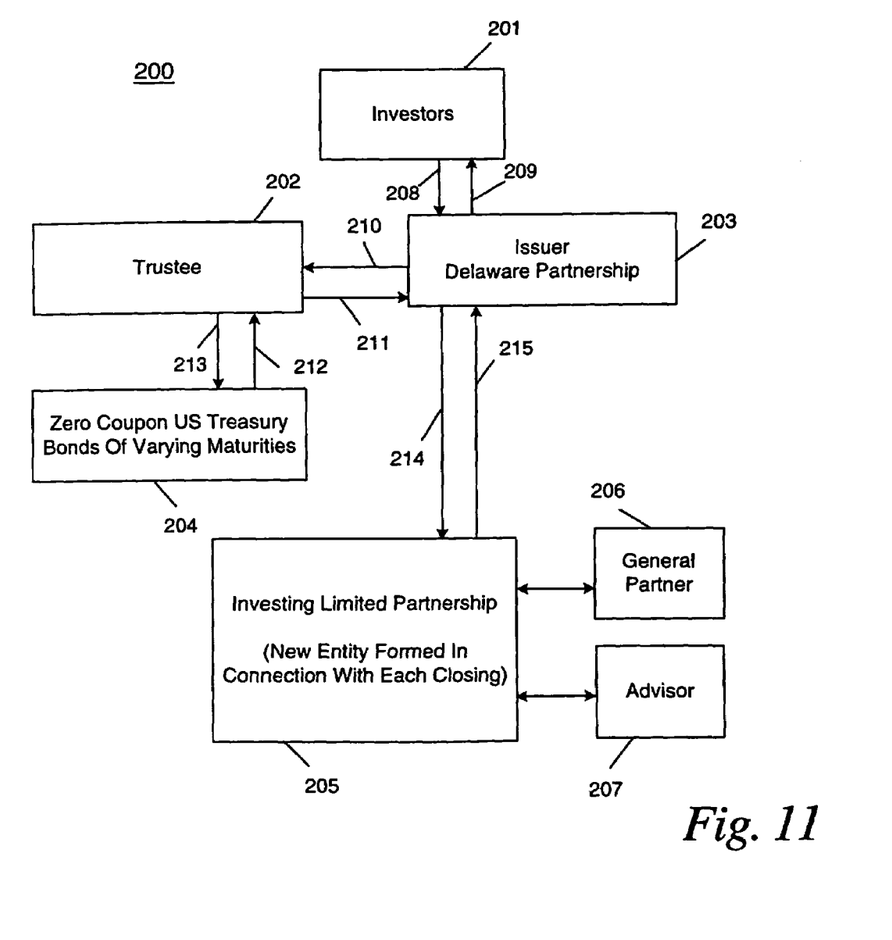
FIG. 11 is a diagram of an exemplary legal framework for implementing the investment structures and methods shown in FIGS. 1-9.

FIG. 11 is a diagram of an exemplary legal framework 200 for implementing the investment structures and methods shown in FIGS. 1-9. Although various types of legal frameworks and legal entities may be used to implement the investment structures and methods, framework 200 provides an example of one such framework and entities consistent with relevant laws governing investment of the funds. For example, framework 200 uses a trustee to invest the fixed component and a separate partnership 205 to invest the contingent component. The same framework 200 can be used for a single client or for multiple clients having pooled funds.

Framework 200 includes investors 201, which represents the clients identified above, who provide capital for investment (208). Preferably, the investors 201 are provided Secured Participating Notes paying periodic minimum fixed interest and contingent interest, if any, and providing full return of principal on the maturity date if the Notes are held to maturity (209). The maturity date coincides with the end of the investment period identified above.

An issuer Delaware partnership 203 receives the capital for investment. The issuer Delaware partnership 203 provides a portion of the net proceeds at a closing (210) to a trustee 202, and provides the remainder of the net proceeds at a closing (214) to an investing limited partnership 205. Preferably, a new partnership 205 is formed in connection with each closing (214). The investing limited partnership 205 provides for investment of the contingent component. Therefore, it provides for limited partnership interest receiving distributions semi-annually of profits, if any, of the investing limited partnership 205 to pay contingent interest and distribution of residual assets of the investing limited partnership 205 upon its liquidation immediately prior to the maturity date (215). The investing limited partnership 205 interacts with a general partner 206 and an advisor 207 for managing and investing the capital in the contingent component.

The trustee 202 holds, for example, zero coupon United States Treasury Bonds of varying maturities 204 for investing the fixed component. The trustee 202 invests the portion of the net proceeds (210) in the bonds 204 to satisfy payment of the minimum (fixed) interest and return of principal at the maturity date (213). Preferably, the proceeds are separately pledged at each closing to secure payment on the Notes issued at the relevant closing.

The bonds 204 thus provide to the trustee 202 the minimum (fixed) interest and return of principal on the maturity date (212). The trustee 202 in turn provides the minimum (fixed) interest and return of principal on the maturity date (211) to the issuer Delaware partnership 203, which returns it (209) to the investors 201.

Figure 12:
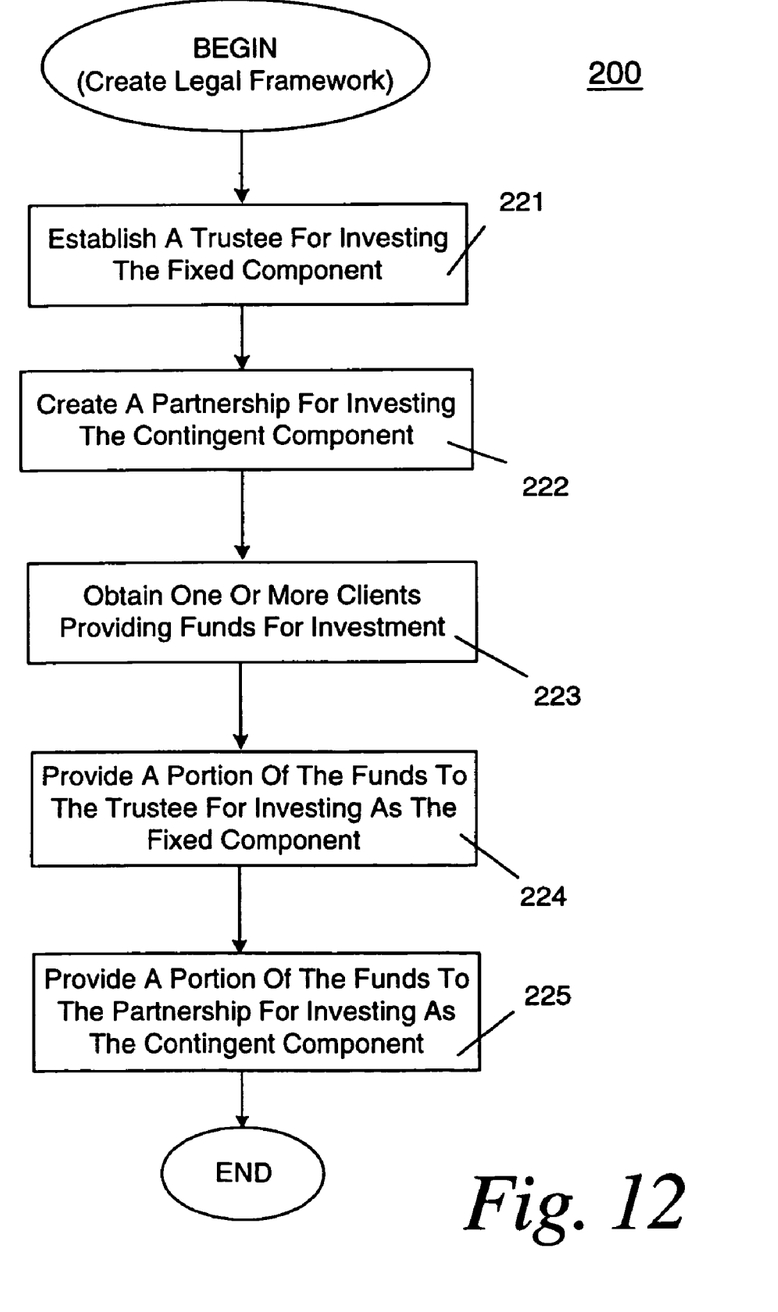
FIG. 12 is a flow chart illustrating a method for implementing the legal framework shown in FIG. 11.

FIG. 12 is a flow chart illustrating a method 220 for implementing the legal framework 200 shown in FIG. 11. The trustee 202 or other legal entity is established for investing the fixed component (step 221). The partnership 205 or other legal entity is also established for investing the contingent component (step 222). One or more clients are obtained providing funds for investment (step 223). A portion of the funds is provided to the trustee 202 for investing as the fixed component (step 224) and another portion of the funds is provided to the partnership 205 for investing as the contingent component (step 225). Additional aspects and variations of the investment process using legal framework 200 can occur as described above.

While the present invention has been described in connection with an exemplary embodiment, it will be understood that many modifications will be readily apparent to those skilled in the art, and this application is intended to cover any adaptations or variations thereof. For example, different types of investments, percentages for the portions of the funds, distribution times for the interest, investment periods, and other investment parameters may be used without departing from the scope of the invention. This invention should be limited only by the claims and equivalents thereof.

What is claimed is:

1. A computer-implemented method comprising:

receiving a plurality of funds to be invested in a structured note, utilizing at least one processor and memory, wherein the structured note guarantees the payment of periodic minimum fixed interest, the payment of periodic contingent interest, if any, and the return of the principal funds upon reaching a maturity date of the structured note;

establishing investment parameters for the structured note, wherein the investment parameters include a time duration for an investment period and a percentage distribution of the funds between a pooled fixed component, a pooled distribution contingent component, and a pooled reinvestment contingent component;

investing first portions of the plurality of funds in the pooled fixed component generating principal plus pooled fixed interest based on parameters of the structured note;

investing second portions of a first set of the plurality of funds in the pooled distribution contingent component generating first pooled contingent interest based on parameters of the structured note;

investing second portions of a second set of the plurality of funds in the pooled reinvestment contingent component generating second pooled contingent interest based on parameters of the structured note;

determining, based on parameters of the structured note, when to selectively distribute at least a portion of the pooled fixed interest, wherein the processor determines the portion of the pooled fixed interest using instructions stored in memory;

distributing at least a portion of the pooled fixed interest;

determining, based on parameters of the structured note, when to selectively distribute at least a portion of the first pooled contingent interest, wherein the processor determines the portion of the first pooled contingent interest using instructions stored in memory;

distributing at least a portion of the first pooled contingent interest;

re-investing at least a portion of the second pooled contingent interest in the pooled reinvestment contingent component based on parameters of the structured note, wherein the processor determines the re-investment portion using instructions stored in memory;

determining, based on parameters of the structured note, when to end an investment period, wherein the processor determines the end of an investment period using instructions stored in memory; and distributing all of the pooled fixed component, the pooled distribution contingent component, the pooled reinvestment contingent component, a remaining portion of the pooled fixed interest, and a remaining portion of the first pooled contingent interest and the second pooled contingent interest when the investment period has ended.

2. The method of claim 1, further including using a trustee for investing the pooled fixed component and using a partnership for investing the pooled distribution contingent component and the pooled re-investment contingent component.

3. The method of claim 1 wherein:
the investing the first portions step includes investing sixty to eighty percent of each of the funds in the pooled fixed component;
the investing the second portions of the first set step includes investing ten to forty percent of each of the first set of funds in the pooled distribution contingent component; and
the investing the second portions of the second set step includes investing ten to forty percent of each of the second set of funds in the pooled re-investment contingent component.

4. The method of claim 1 wherein the investing the first portions step includes investing the pooled fixed component in one or more of the following: treasury notes, AAA-rated securities, AA-rated securities, municipal bond notes, or variable rate notes.

5. The method of claim 1 wherein the investing the second portions steps include investing the pooled distribution contingent component and the pooled re-investment contingent component in one or more of the following: futures, options, or forward positions.

6. The method of claim 1, further including distributing the pooled fixed component, the pooled contingent distribution component, the pooled re-investment contingent component, and the second pooled contingent interest after an investment period.

7. A computer-implemented method comprising:
receiving a plurality of funds to be invested in a structured note, utilizing at least one processor and memory, wherein the structured note guarantees the payment of periodic minimum fixed interest, the payment of periodic contingent interest, if any, and the return of the principal funds upon reaching a maturity date of the structured note;
establishing investment parameters for the structured note, wherein the investment parameters include a time duration for an investment period and a percentage distribution of the funds between a pooled fixed component, a pooled distribution contingent component, and a pooled reinvestment contingent component;
investing first portions of the plurality of funds in the pooled fixed component generating principal plus pooled fixed interest, based on parameters of the structured note;
investing second portions of a first set of the plurality of funds in the pooled distribution contingent component generating first pooled contingent interest, based on parameters of the structured note;
investing second portions of a second set of the plurality of finds in the pooled reinvestment contingent component generating second pooled contingent interest, based on parameters of the structured note;
re-investing at least a portion of the pooled fixed interest in the pooled fixed component based on parameters of the structured note, wherein the processor determines the re-investment portion using instructions stored in memory;
determining, via a computer system, when to selectively distribute at least a portion of the pooled fixed interest based on the established investment parameters;
determining, via the computer system, when to selectively distribute at least a portion of the first pooled contingent interest based on the established investment parameters;
distributing at least a portion of the first pooled contingent interest;
re-investing at least a portion of the second pooled contingent interest in the pooled reinvestment contingent component;
determining, via the computer system, when to end an investment period based on parameters; and
distributing all of the pooled fixed component, the pooled distribution contingent component, the pooled reinvestment contingent component, the pooled fixed interest, and a remaining portion of the first pooled contingent interest and the second pooled contingent interest when the investment period has ended.

8. The method of claim 7, further including using a trustee for investing the pooled fixed component and using a partnership for investing the pooled distribution contingent component and the pooled re-investment contingent component.

9. The method of claim 7 wherein:
the investing the first portions step includes investing sixty to eighty percent of each of the funds in the pooled fixed component;
the investing the second portions of the first set step includes investing ten to forty percent of each of the first set of funds in the pooled distribution contingent component; and
the investing the second portions of the second set step includes investing ten to forty percent of each of the second set of funds in the pooled re-investment contingent component.

10. The method of claim 7 wherein the investing the first portions step includes investing the pooled fixed component in one or more of the following: treasury notes, AAA-rated securities, AA-rated securities, municipal bond notes, or variable rate notes.

11. The method of claim 7 wherein the investing the second portions steps include investing the pooled distribution contingent component and the pooled re-investment contingent component in one or more of the following: futures, options, or forward positions.

12. The method of claim 7, further including distributing the pooled fixed component, the pooled fixed interest, the pooled contingent distribution component, the pooled re-investment contingent component, and the second pooled contingent interest after an investment period.

13. A computer implemented method comprising:
investing first portions of a plurality of funds in a pooled fixed component in a structured note, utilizing at least one processor and memory, and generating principal plus pooled fixed interest;
investing second portions of a first set of the plurality of funds in a pooled distribution contingent component and generating first pooled contingent interest; and investing second portions of a second set of the plurality of funds in a pooled reinvestment contingent component and generating second pooled contingent interest, wherein at least a portion of the pooled fixed interest is distributed, at least a portion of the first pooled contingent interest is distributed, and at least a portion of the second pooled contingent interest is re-invested in the pooled reinvestment contingent component, wherein the structured note establishes investment parameters including a time duration for an investment period and a percentage distribution of the funds between the pooled fixed component, the pooled distribution contingent component, and the pooled reinvestment contingent component, wherein the structured note guarantees the payment of periodic minimum fixed interest, the payment of periodic contingent interest, if any, and the return of the principal funds upon reaching a maturity date of the structured note, wherein the the processor determines when to selectively distribute at least a portion of the fixed interest and when to selectively distribute at least a portion of the first pooled contingent interest using instructions stored in memory, based on the established investment parameters, wherein the processor determines when to end an investment period using instructions stored in memory based on the established investment parameters, and wherein all of the pooled fixed component, the pooled distribution contingent component, the pooled reinvestment contingent component, the pooled fixed interest, the first pooled contingent interest, and the second pooled contingent interest are distributed when the investment period has ended.

14. The method of claim 13 wherein a trustee invests the pooled fixed component and a partnership invests the pooled distribution contingent component and the pooled re-investment contingent component.

15. The method of claim 13 wherein:
the pooled fixed component invests sixty to eighty percent of each of the funds;
the pooled distribution contingent component invests ten to forty percent of each of first set of the funds; and
the pooled re-investment contingent component invests ten to forty percent of each of second set of the funds.

16. The method of claim 13 wherein the pooled fixed component is invested in one or more of the following: treasury notes, AAA-rated securities, AA-rated securities, municipal bond notes, or variable rate notes.

17. The method of claim 13 wherein the pooled distribution contingent component and the pooled re-investment contingent component are invested in one or more of the following: futures, options, or forward positions.

18. The method of claim 13 wherein the pooled fixed component, the pooled distribution contingent component, and the pooled re-investment contingent component invest the first and second portions of each of the funds for an investment period.

19. A computer implemented method comprising:
investing first portions of a plurality of funds in a pooled fixed component, utilizing at least one processor and memory, and generating principal plus pooled fixed interest;
investing second portions of a first set of the plurality of funds in a pooled distribution contingent component and generating first pooled contingent interest; and
investing second portions of a second set of the plurality of funds in a pooled reinvestment contingent component and generating second pooled contingent interest, wherein at least a portion of the pooled fixed interest is re-invested in the pooled fixed component, at least a portion of the first pooled contingent interest is distributed, and at least a portion of the second pooled contingent interest is re-invested in the pooled reinvestment contingent component, wherein the structured note establishes investment parameters including a time duration for an investment period and a percentage distribution of the funds between the pooled fixed component, the pooled distribution contingent component, and the pooled reinvestment contingent component, wherein the structured note guarantees the payment of periodic minimum fixed interest, the payment of periodic contingent interest, if any, and the return of the principal funds upon reaching a maturity date of the structured note, wherein the processor determines when to selectively distribute at least a portion of the fixed interest and when to selectively distribute at least a portion of the first pooled contingent interest, using instructions stored in memory, based on the established investment parameters, wherein the processor determines when to end an investment period, using instructions stored in memory, based on the established investment parameters, and wherein all of the pooled fixed component, the pooled distribution contingent component, the pooled reinvestment contingent component, the pooled fixed interest, the first pooled contingent interest, and the second pooled contingent interest are distributed when the investment period has ended.

20. The method of claim 19 wherein a trustee invests the pooled fixed component and a partnership invests the pooled distribution contingent component and the pooled re-investment contingent component.

21. The method of claim 19 wherein:
the pooled fixed component invests sixty to eighty percent of each of the funds;
the pooled distribution contingent component invests ten to forty percent of each of first set of the funds; and
the pooled re-investment contingent component invests ten to forty percent of each of second set of the funds.

22. The method of claim 19 wherein the pooled fixed component is invested in one or more of the following: treasury notes, AAA-rated securities, AA-rated securities, municipal bond notes, or variable rate notes.

23. The method of claim 19 wherein the pooled distribution contingent component and the pooled re-investment contingent component are invested in one or more of the following: futures, options, or forward positions.

24. The method of claim 19 wherein the pooled fixed component, the pooled distribution contingent component, and the pooled re-investment contingent component invest the first and second portions of each of the funds for an investment period.

* * * * *